United States Patent [19]

Sharp

[11] Patent Number: 5,018,558
[45] Date of Patent: May 28, 1991

[54] STORAGE TANK SYSTEM WITH INTERNAL OVERFILL MEANS

[76] Inventor: Bruce R. Sharp, 4090 Rose Hill Ave., Cincinnati, Ohio 45229

[21] Appl. No.: 547,914

[22] Filed: Jul. 3, 1990

Related U.S. Application Data

[63] Continuation of Ser. No. 279,836, Dec. 5, 1988, abandoned, which is a continuation-in-part of Ser. No. 66,691, Jun. 26, 1987, abandoned, which is a continuation-in-part of Ser. No. 820,027, Aug. 11, 1987, Pat. No. 4,685,327, which is a continuation-in-part of Ser. No. 740,869, Jun. 3, 1985, Pat. No. 4,607,522, which is a continuation-in-part of Ser. No. 544,013, Oct. 21, 1983, Pat. No. 4,523,454, and Ser. No. 580,800, Feb. 16, 1984, Pat. No. 4,524,609, which is a continuation-in-part of Ser. No. 544,012, Oct. 21, 1983, abandoned, and a continuation-in-part of Ser. No. 745,540, Jun. 17, 1985, abandoned.

[51] Int. Cl.[5] .................... F16K 24/00; B65B 31/00
[52] U.S. Cl. .................... 141/198; 137/587; 220/86.1; 141/59; 141/290; 141/35
[58] Field of Search .................... 141/192, 198, 51, 54, 141/57, 59, 35, 40, 86, 230-232, 285, 301, 302; 137/587-589, 386, 393; 220/855, 86 R

[56] References Cited

U.S. PATENT DOCUMENTS

| | | | |
|---|---|---|---|
| 2,771,917 | 11/1956 | Cannell | 141/217 |
| 3,381,723 | 5/1968 | Quest | 141/39 |
| 3,494,387 | 2/1970 | Gilles et al. | 141/40 |
| 3,658,080 | 4/1972 | Mitchell | 137/588 X |
| 3,732,902 | 5/1973 | Muller | 141/198 |
| 3,770,028 | 11/1973 | Modden | 141/59 |
| 3,807,465 | 4/1974 | Ginsburgh et al. | 141/285 |
| 3,908,718 | 9/1975 | Bower | 141/59 |
| 3,983,913 | 5/1976 | Bower | 141/95 |
| 4,083,387 | 4/1978 | Stieber et al. | 141/95 |
| 4,513,795 | 4/1985 | Davis et al. | 141/35 |
| 4,592,386 | 6/1986 | Mooney | 141/59 |

Primary Examiner—Ernest G. Cusick
Attorney, Agent, or Firm—Charles R. Wilson

[57] ABSTRACT

An underground storage tank system has an internal retained capacity area for receiving excess liquid from a filling operation. The storage tank system comprises a rigid storage tank, a coaxial fill line with a fill pipe and an outer concentric vapor recovery tube, a vent line, a dispensing line, and a trapped vapor release valve. A vapor recovery extension tube and vent extension line each extend into the storage tank. The uppermost of the lower end of the vapor recovery extension tube and lower end of the vent extension line within the rigid tank defines a horizontal plane above which is an internal retained capacity area. The trapped vapor release valve is closed during a filling operation so that eventually a build up of pressure occurs within the retained capacity area to prevent further flow of liquid to the tank. Opening of the trapped vapor release valve relieves the pressure in the retained capacity area thereby allowing excess liquid in the fill pipe and delivery hose to drain into the rigid storage tank.

6 Claims, 5 Drawing Sheets

STORAGE TANK SYSTEM WITH INTERNAL OVERFILL MEANS

This is a continuation of application Ser. No. 07/279,836 filed 12/5/88 now abandoned, which is a continuation-in-part of "Total Containment and Overfill Storage Tank System", Ser. No. 07/066,691, filed June 26, 1987, now abandoned, which is a continuation-in-part of "Total Containment Storage Tank System", Ser. No. 820,027, filed Aug. 11, 1987, now U.S. Pat. No. 4,685,327, which is a continuation-in-part of "Storage Tanks Having Secondary Containment Means," Ser. No. 06/740,869, filed June 3, 1985, now U.S. Pat. No. 4,607,522, which is a continuation-in-part of "External Jacket System As Secondary Containment For Storage Tanks", Ser. No. 544,013, filed Oct. 21, 1983, now U.S. Pat. No. 4,523,454 and "Storage Tank Systems", Ser. No. 06/580,800, filed Feb. 16, 1984, now U.S. Pat. No. 4,524,609 which is a continuation-in-part of "Storage Tank Systems", Ser. No. 06/544,012, filed Oct. 21, 1983, now abandoned and a continuation-in-part of "Fiberglass Reinforced Resin Storage Tanks With Secondary Containment Means", Ser. No. 06/745,540, filed June 17, 1985, now abandoned.

FIELD OF THE INVENTION

This invention relates to a liquid storage tank system. More particularly, the invention relates to an underground storage tank system having a means to safely handle overfill liquid from a filling operation.

BACKGROUND OF THE INVENTION

Storage tanks are widely used for storing a variety of liquids. Some of these liquids are hazardous and can be corrosive and/or flammable. In particular, underground storage tanks are used extensively for the storage of liquid gasoline at retail gasoline stations. Filling of the tanks is accomplished from a transport tank truck parked adjacent the top of a fill pipe located at ground level. The fill pipe is permanently connected to the underground storage tank. The transport tank truck operator attaches a flexible delivery hose leading from the transport tank truck's control panel to a liquid tight fitting on the top end of the tank's fill pipe. The operator next opens a valve located at the transport tank truck. Gasoline fills the flexible hose, the underground tank's fill pipe and finally the storage tank.

The filling operation is normally accomplished by gravity unloading of the gasoline in the transport tank truck to the underground tank. The gasoline flows into the underground storage tank until the filling operation is stopped by the tank truck operator or the underground tank and access pipes completely fill creating an overfill situation. Such overfill results in a substantial amount (up to about thirty-five gallons) of gasoline trapped in the commonly used four inch diameter flexible delivery hose. When an overfill occurs the operator first turns off the valve at the transport tank trunk. Unless special precautions are taken, gasoline contained within the flexible delivery hose is spilled onto the ground causing earth and water contamination.

Present underground tanks are required by federal regulations to have an overfill containment device to prevent overfilling. Various overfill devices and auxiliary holding tank systems are known in the prior art. Examples of these are disclosed in U.S. Pat. Nos. 3,983,913; 4,204,564; and 4,501,305. The disclosed systems are not fully satisfactory in one way or another.

There has now been discovered a storage tank system with provision for overfilled liquid. The present invention solves the problems inherent with existing storage tank systems and auxiliary overfill equipment.

SUMMARY OF THE INVENTION

The storage tank system of the invention comprises (a) a rigid tank, (b) a coaxial fill line extending from, near ground surface into the rigid tank, said coaxial fill line comprised of a fill pipe with a concentric vapor recovery tube and vapor recovery extension tube wherein a lower end of the vapor recovery extension tube terminates from about two inches to about eighteen inches from a top surface of the rigid tank's storage area, (c) a vent line and vent extension line extending into the rigid tank wherein a lower end of the vent extension line terminates from about two inches to about eighteen inches from the top inside surface of the rigid tank's storage area and the vent line is open to the atmosphere, (d) a dispensing line leading from within the rigid tank to a dispenser at ground surface; and (e) a trapped vapor release valve in operable association with the rigid tank's storage area. A retained capacity area in the tank comprises that portion of the tank's storage are which is above the uppermost of the lower ends of the vapor recovery tube and vent line. The trapped vapor release valve is closed during a filling operation so that vapors in the retained capacity area will prevent liquid from so entering. Opening of the trapped vapor release valve vents the trapped vapors and allows liquid in the delivery hose to flow into the retained capacity area.

DETAILED DESCRIPTION OF THE INVENTION

While the description which follows describes the invention in terms of its use with underground gasoline storage tanks, it should be understood the invention has applicability for other uses as well. For example, storage tanks used for storing liquids other than gasoline can utilize the present invention.

Figure 1:
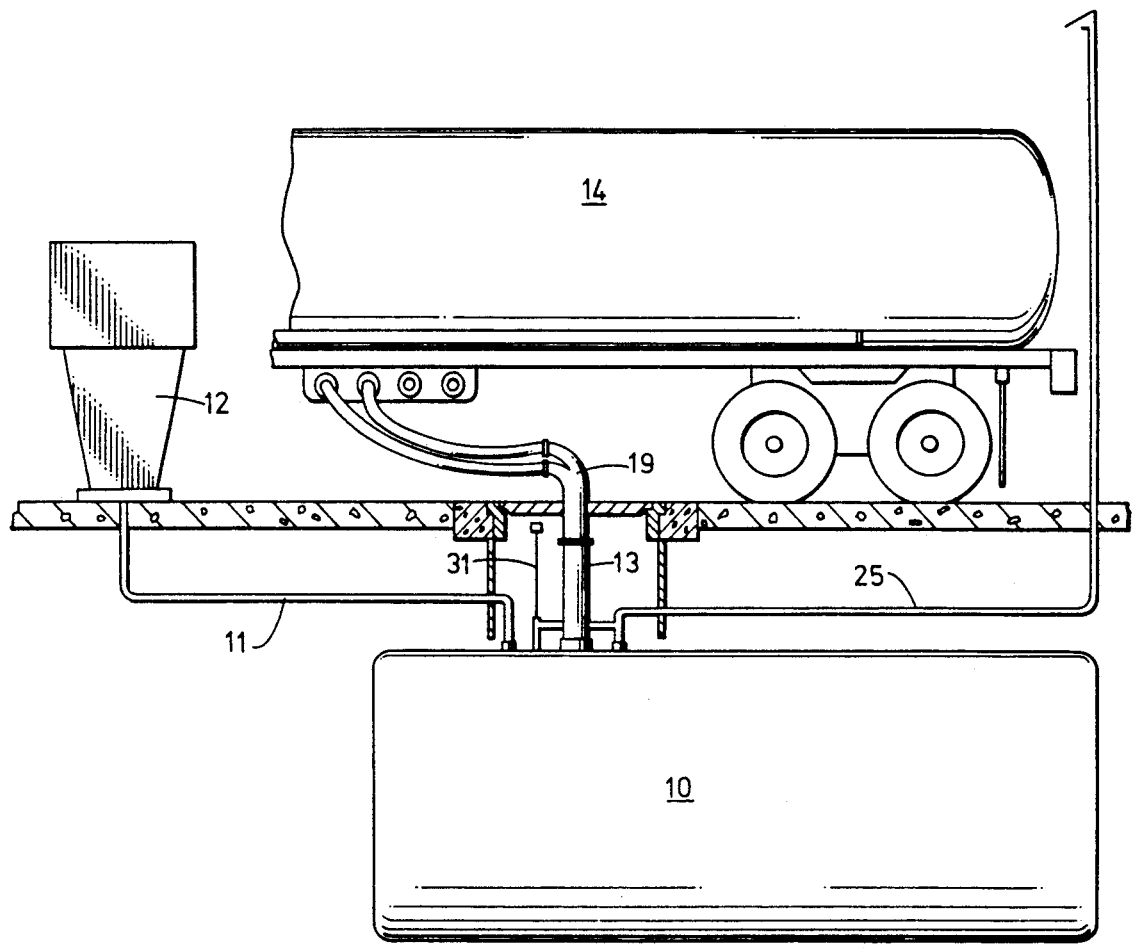
FIG. 1 is a side view of a storage tank system of this invention in the process of being filled with a transport truck.
Figure 2:
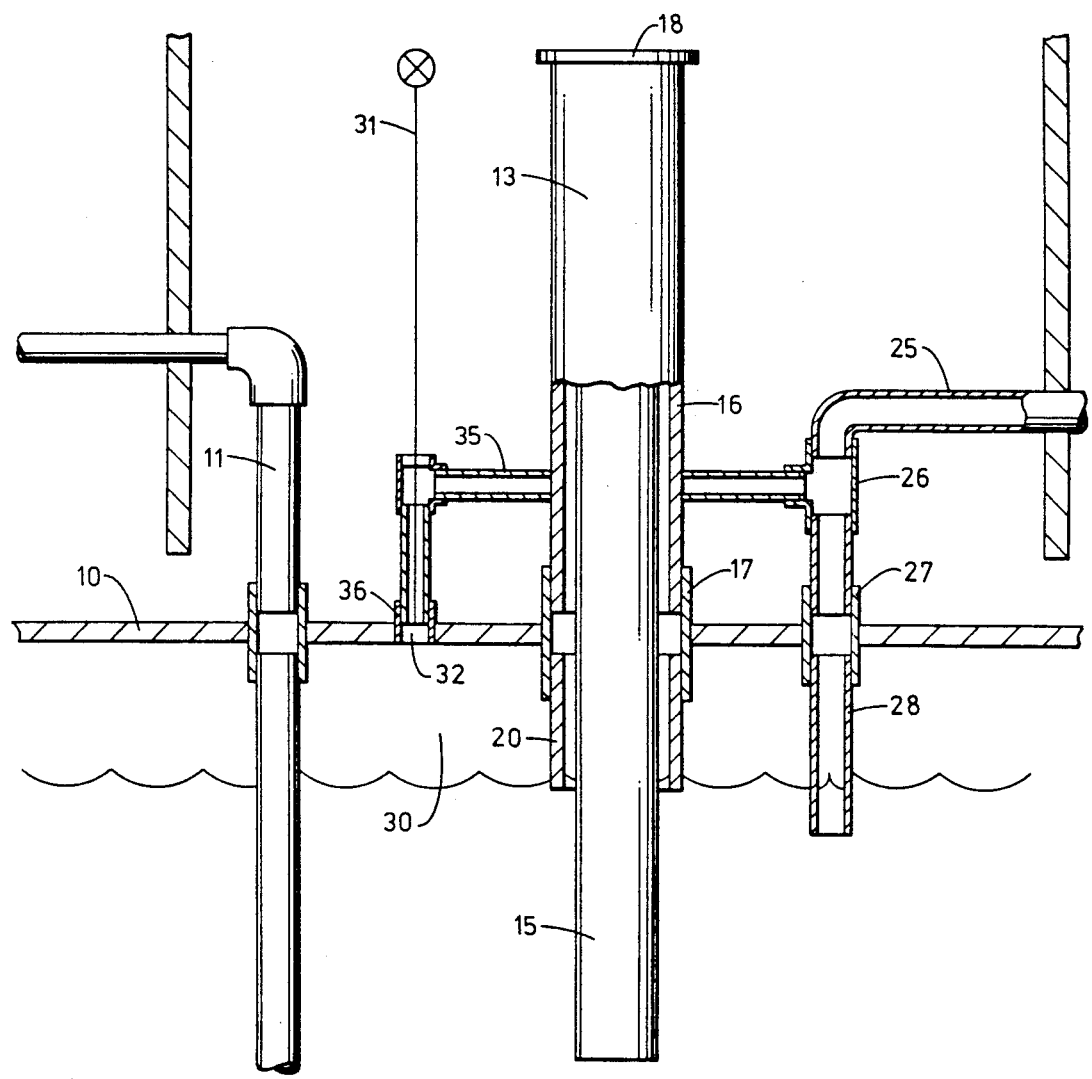
FIG. 2 is a partial side view of the storage tank system of FIG. 1 showing an internal retained capacity area.
Figure 3:
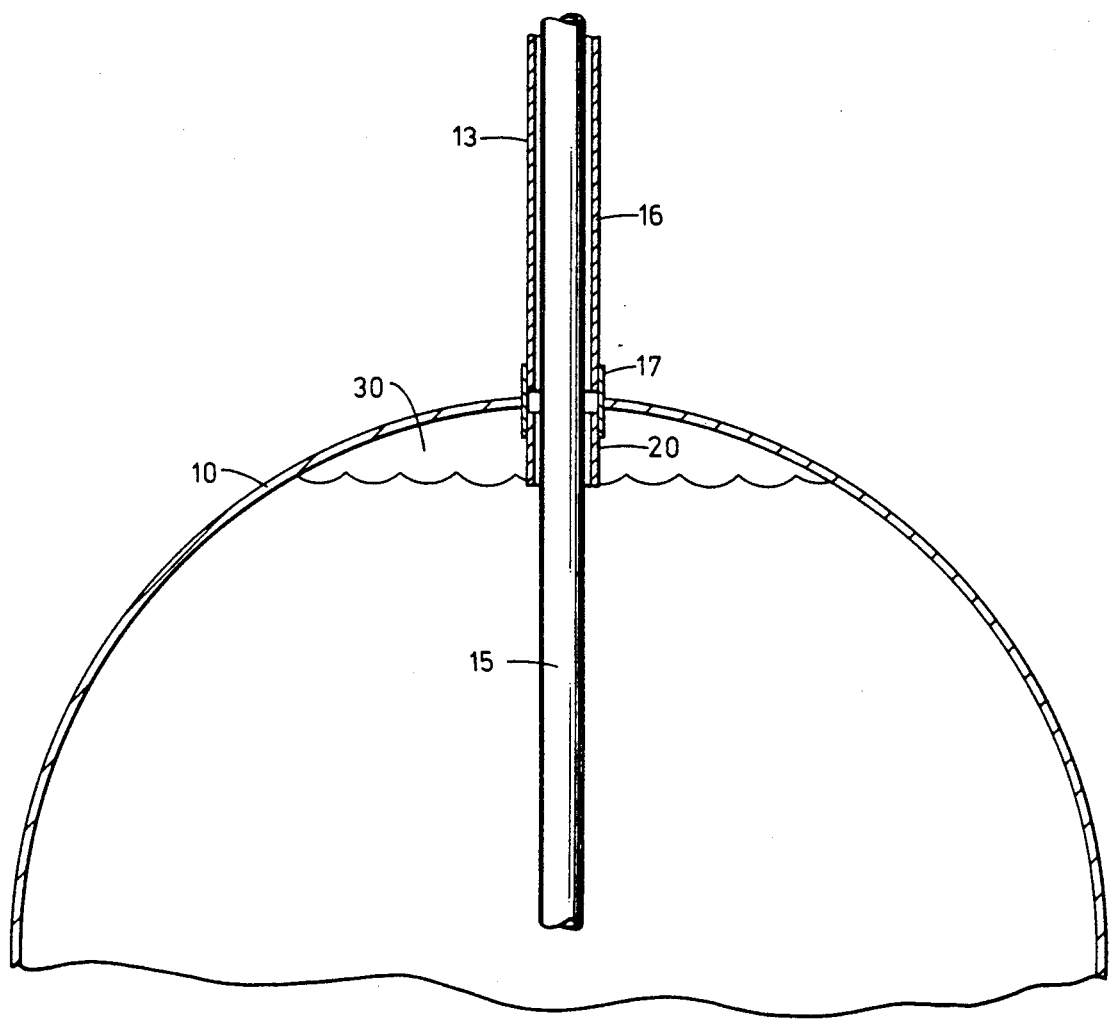
FIG. 3 is a end view taken along lines 3—3 of FIG. 1 showing the internal retained capacity area for handling overfilled liquid.

With reference to FIGS. 1-3 there is shown an underground storage tank 10. Storage tanks 10 of the type shown are well known and are widely used, especially in the gasoline service station industry. They are typically made of metal or, more recently, a fiberglass reinforced resin material. Either type of tank or a composite structure of the two has use in this invention. Such tanks have a capacity of at least about 1,000 gallons of liquid, preferably at least about 4,000 gallons of liquid. A typical metal storage tank is shown in FIG. 1. The tank is cylindrically shaped and is usually buried about four feet. Various support and hold-down means (not shown) are used to keep the tank stationary. Access lines for dispensing, filling, and venting operations lead into the tank's interior storage area. Such lines are attached to the tank's top surface in a liquid tight fashion. As shown a ground level manway pit is provided to allow convenient access to all the access lines and tank.

Dispensing line 11 is used for withdrawing gasoline from the tank and delivering it to the consumer through gasoline dispenser 12. The line enters the storage tank 10 by means of known liquid tight fittings. The line extends down into the tank to near its bottom surface. Normally a submerged pump is positioned within the tank to supply the dispenser. Another method of pumping the gasoline from the tank is accomplished by the dispenser having contained within it a suction pump to withdraw the gasoline from the tank.

A coaxial fill line 13 extends from the storage tank 10 to near ground level. It provides as its obvious function the conduit through which gasoline flows into the storage tank from an outside source, e.g., a transport tank truck 14. The coaxial fill lines has an interior fill pipe 15 through which the liquid gasoline passes during the filling operation. The fill pipe preferably extends into the tank's storage area to near its bottom surface to minimize splashing and vapor formation during a filling operation. A concentric outer pipe represents vapor recovery tube 16. The tube returns vapors formed within the rigid tank during the filling operation to the transport tank truck, and thus, effectively handles such vapors without polluting the atmosphere. The coaxial fill line 13 is securely fastened to a double tapped bushing 17, which is attached to the top of tank 10. A removable cap 18 attaches to a cap adapter at a top end of the fill line. The cap adapter is used for assuring a liquid light attachment with the transport truck's delivery hose 19. Coaxial fill lines of this general nature are common and are mandated in many areas. In accord with this invention, lower extension tube 20 leading from the vapor recovery tube 16 extends from about two inches to about eighteen inches from the top inside surface of the storage tank into the tank's interior.

A vent line 25 leading into the tank 10 provides a means by which displacement of air/vapors can be directed to the atmosphere primarily during one part of the filling operation and also prevents a vacuum formation during emptying of tank 10. The vent line 25 is secured to the top of the tank by use of threaded bushing 27. Vent tee 26 is provided in the vent line to accommodate a by-pass vent line as discussed below. In normal practice, the vent line 25 ends at the top of the rigid tank. In accord with this invention, a lower vent extension line 28 leads from bushing 27 into the uppermost portion of the interior storage area. The vent extension line extends from about two inches to about eighteen inches from the top inside surface of the storage tank into the tank's interior. Optionally, a ball float valve is installed at the end of the vent extension line 28 to prevent liquid from entering.

Thus, the vapor recovery extension tube and vent extension line each extend from the top surface of the tank into the tank's storage area from about two inches to about eighteen inches. Preferably, the vapor recovery extension tube and vent extension line each end from about two inches to about five inches from the top inside surface of the tank's storage area. The area 30 within the rigid tank is defined by an imaginary horizontal plane extending from the uppermost of the lower end of the vapor recovery extension tube and lower end of the vent extension line within the tank and the upper walls of the tank. This area is referred to herein as the rigid tank's internal retained capacity area. The retained capacity area is capable of holding at least about five gallons, with the most preferred capacity being about thirty to fifty gallons. In operation, the retained capacity area is used to receive excess liquid primarily from the transport truck's delivery hose and fill pipe.

When the liquid being filled into tank 10 reaches the uppermost opening within the tank of lines 20 and 28, air and other vapors will become trapped in the tank to form the interior retained capacity area 30. A pressure build-up within this area from a lack of venting will prevent additional liquid from entering the tank. Any liquid which continues to flow from the transport truck will occupy the fill line 15, vapor recovery extension tube 20, vapor recovery tube 16, vent extension line 28, vent line 25 (including bypass vent line 35) and delivery hose 19 to equalize levels with liquid remaining in the transport truck's tank. The filling operation is effectively terminated with a consequent overfill situation. After the delivery line valve at the transport truck is turned off the line is drained by use of control rod 31 operably associated with trapped vapor release valve 32 located at its end and by-pass vent line 35. The by-pass vent line is connected securely by bushing 36 to the top surface of the tank. It communicates with the vent line 25 through vent tee 26. When valve 32 is opened the trapped vapors are vented out of the retained capacity area 30 through by-pass vent line 35 and atmospheric vent lines 25. The liquid trapped in the flexible delivery hose, fill line, vapor recovery tube and extension tube, and vent line and extension line can now displace the trapped vapors in the retained capacity area 30.

Figure 4:
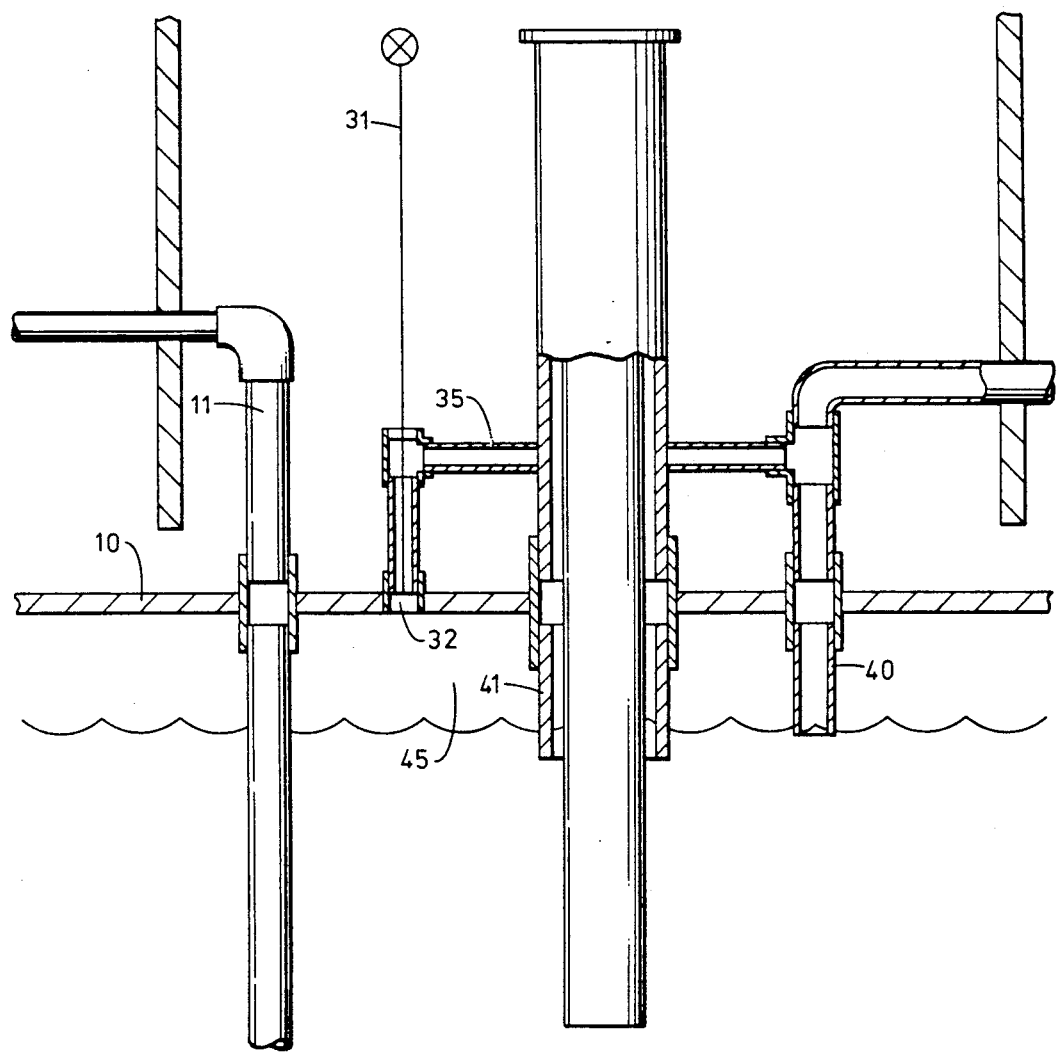
FIG. 4 is a partial side view showing another internal retained capacity area within a rigid tank as defined by the end of a vent line.

FIG. 4 illustrates an embodiment of the invention wherein the end of the vent extension line 40 is higher than the end of the vapor recovery extension tube 41. In this figure, the rigid tank 10 and access liens perform the same function as above described with reference to FIGS. 1-3. However, the ends of the vent extension line 40 and vapor recovery extension tube 41 terminate at different levels within the storage tank. In this situation the retained capacity area 45 extends from the horizontal plane at the vent extension line's lower end to the top surface of the rigid tank.

Figure 5:
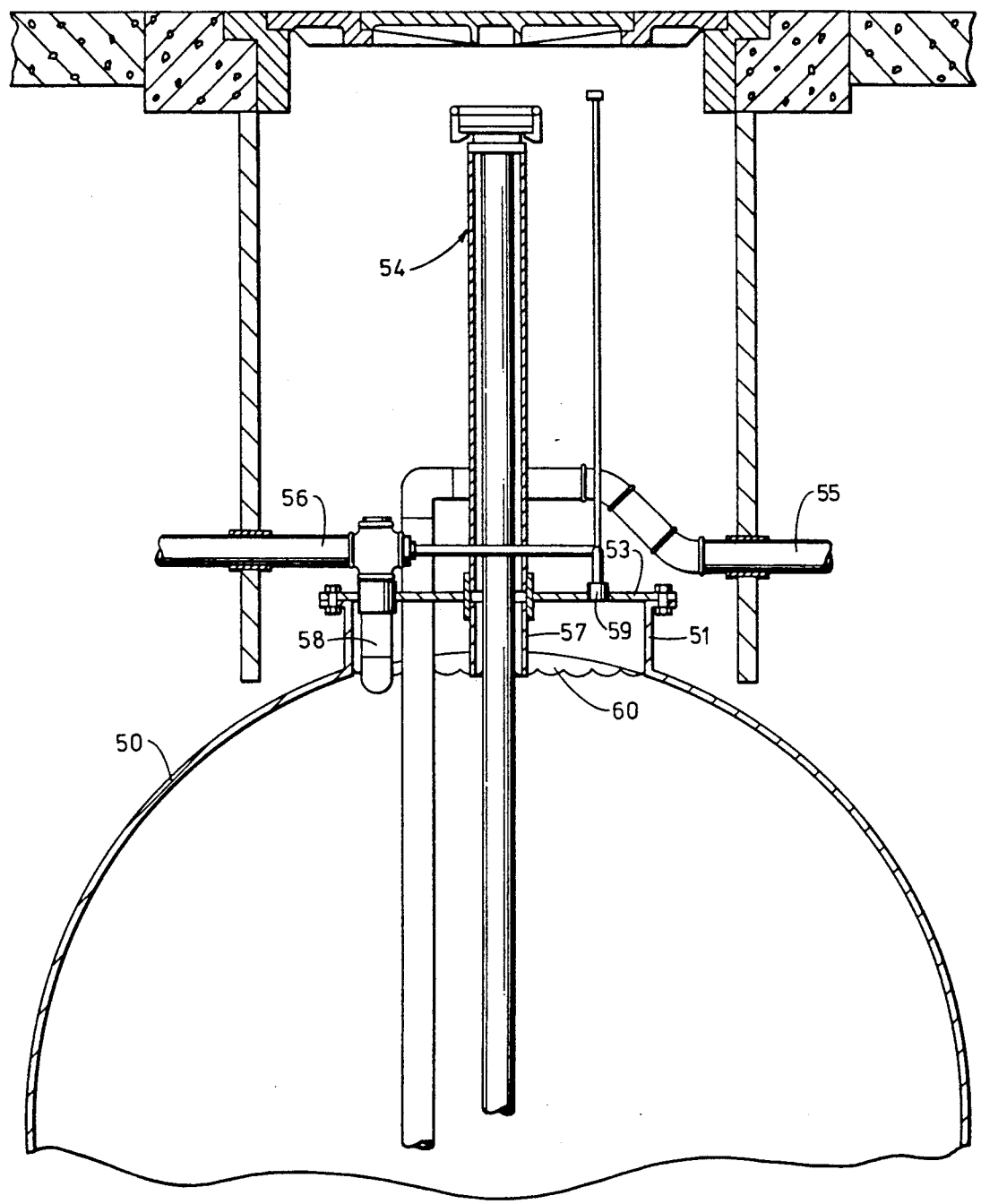
FIG. 5 is an end view illustrating another storage tank system of this invention wherein a manway is positioned on top of a rigid tank.

FIG. 5 illustrates another type of storage tank useful with the invention. As shown, the tank 50 has a manway 51 for access to its interior. The manway is secured in a liquid tight fashion to the top of the rigid inner storage tank. The manway's primary function is to serve as an access way to gain entry to the interior of the tank 50. It is generally cylindrical in shape and preferably sized about one to three feet in diameter. Other shapes and dimensions can be utilized. A lid 53, opening into the storage tank's interior, is securely attached to the manway 51. It is securely fastened, preferably in liquid tight fashion by known attachment means, e.g., bolts and nuts. The lid also serves as a surface through which the access lines pass. Disconnecting all lines passing through the lid and removal of the lid itself will allow an individual to enter the tank.

The coaxial fill line 54, dispensing line 55 and vent line 56 all individually enter through the lid covering the manway. Coaxial fill pipe 54 has a vapor recovery extension tube 57 which leads into the interior of the rigid tank. Similarly, vent line 56 has an extension line 58 which extends into the tank approximately the same distance as extension 57. Extensions 57 and 58 each end from about two inches to about eighteen inches, preferably between about two inches to about five inches from the inside surface of lid 53. The internal retained capacity area 60 of the rigid tank is that area which extends from an imaginary plane level-with the uppermost end of the vapor recovery extension tube and vent extension line to the top surface of the manway. Thus, the internal capacity area 60 can include all or a part of the area within the manway and a portion or none of the tank's storage area. A trapped vapor release valve 59 operably associated with the retained capacity area and the vent line 56 is also provided and words in a manner as above described.

As shown the trapped vapor release valve is always operably associated with the vent line. In alternative embodiments of the invention, a separate trapped vapor vent line extends from the internal retained capacity area to the atmosphere. Additionally, a separate line leading from the trapped vapor release valve to the vapor recovery tube can also be used to effectively release a pressure build-up in the retained capacity area.

In operation, a gasoline transport truck is parked adjacent a ground access area for a coaxial fill line leading to a storage tank. The delivery hose is connected to a fitting on the coaxial fill line and the pressure release valve is closed. Gasoline flows through a fill pipe into the rigid tank until a build-up of pressure in the storage tank's retained capacity area causes the gravity flow of gasoline to the storage tank itself to cease. Liquid will continue to flow by gravity to occupy the fill pipe, vapor recovery tube and vent line if a ball float is not used. A flow valve at the transport truck is closed. Next, the trapped vapor release valve associated with the retained capacity area is opened. Pressure build-up in the tank is relieved to the atmosphere or back to the truck's tank, thereby allowing gasoline left primarily in the deliver hose and fill pipe to flow by gravity to the retained capacity area of the storage tank. While the invention has been described with respect to certain embodiments, it should be understood that various modifications may be made without departing from the spirit and scope of the claims.

What is claimed is:

1. A underground storage tank system having an internal retained capacity area for receiving overflow of liquid resulting from a filling operation through a delivery hose, comprising:
   (a) a rigid storage tank having a storage area of at least about 1,000 gallons of liquid;
   (b) a coaxial fill line extending from near ground surface into the storage tank, said coaxial fill line comprised of a fill pipe extending into the storage tank for delivering liquid therethrough and an outer vapor recovery tube concentric with the fill pipe which is attached to the storage tank and a vapor recovery extension tube extending therefrom with a lower end terminating from about two inches to about eighteen inches from a top inside surface of the storage tank, whereby said vapor recovery tube and vapor recovery extension tube receive vapors formed within the storage tank during the filling operation;
   (c) a vent line attached to the storage tank and a vent extension line extending therefrom with a lower end terminating from about two inches to about eighteen inches from a top inside surface of the storage tank, wherein the area within the storage tank which is above the vapor recovery extension tube termination and vent extension line termination which is uppermost represents the internal retained capacity area;
   (d) a dispensing line leading from within the storage tank to a dispenser at ground surface;
   (e) a trapped vapor release valve in operable association with the retained capacity area so that when closed during a filling operation trapped vapors within the storage tank causes a build up of pressure to prevent liquid from completely occupying the retained capacity area and when opened permits excess liquid in the fill pipe to freely flow into the retained capacity area; and
   (f) a by-pass vent line which extends from the trapped vapor release valve to the vent line such that opening of the trapped vapor release valve allows the trapped vapors in the internal retained capacity area to pass therefrom through the by-pass vent line and then the vent line.

2. The storage tank system of claim 1 wherein the vent extension line extends from about two inches to about fives inches into the storage tank.

3. The storage tank system of claim 2 wherein the vapor recovery extension tube of the coaxial fill line extends into the storage tank to a level approximately equal to that of the vent extension line.

4. The storage tank system of claim 1 wherein the storage tank has a manway extending from its top surface and the area within the manway represents at least a part of the storage tank's storage area.

5. The storage tank system of claim 4 wherein at least a part of the area within the manway represents the storage tank's internal retained capacity area.

6. The storage tank system of claim 1 wherein the storage tank holds at least about 4,000 gallons of liquid.

* * * * *